(12) United States Patent
Imai

(10) Patent No.: US 12,463,290 B2
(45) Date of Patent: Nov. 4, 2025

(54) NON-AQUEOUS ELECTROLYTIC SOLUTION SECONDARY BATTERY, SEPARATOR FORMED OF NON-AQUEOUS ELECTROLYTIC SOLUTION SECONDARY BATTERY, AND METHOD OF MANUFACTURING NON-AQUEOUS ELECTROLYTIC SOLUTION SECONDARY BATTERY

(71) Applicant: FUJIFILM Corporation, Tokyo (JP)

(72) Inventor: Shinji Imai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 761 days.

(21) Appl. No.: 17/699,186

(22) Filed: Mar. 21, 2022

(65) Prior Publication Data
US 2022/0209362 A1 Jun. 30, 2022

Related U.S. Application Data

(63) Continuation of application No. PCT/JP2020/040485, filed on Oct. 28, 2020.

(30) Foreign Application Priority Data

Oct. 30, 2019 (JP) .................................. 2019-197747

(51) Int. Cl.
*H01M 50/449* (2021.01)
(52) U.S. Cl.
CPC .................................. *H01M 50/449* (2021.01)
(58) Field of Classification Search
CPC ............. H01M 50/449; H01M 50/489; H01M 10/4235
See application file for complete search history.

(56) References Cited

U.S. PATENT DOCUMENTS

2006/0063066 A1* 3/2006 Choi ................. H01M 10/0525
429/62
2013/0143076 A1* 6/2013 Sachdev ................. H01G 11/52
429/50
(Continued)

FOREIGN PATENT DOCUMENTS

JP 2006002134 1/2006
JP 2006187891 7/2006
(Continued)

OTHER PUBLICATIONS

Jaime-Azuara et al. "Exploratory DSC investigation on the solvolytic depolymerization of PET in varied solvent systems and in the presence of model additives and contaminants." Polymer Degradation and Stability 224 (2024): 110751. (Year: 2024).*
(Continued)

*Primary Examiner* — Sadie White
*Assistant Examiner* — Kayla Elaine Clary
(74) *Attorney, Agent, or Firm* — JCIPRNET

(57) ABSTRACT

Provided are a non-aqueous electrolytic solution secondary battery, a separator formed of the non-aqueous electrolytic solution secondary battery, and a method of manufacturing the non-aqueous electrolytic solution secondary battery. The non-aqueous electrolytic solution secondary battery includes a positive electrode, a negative electrode, and a composite separator that is disposed between the positive electrode and the negative electrode, in which in the composite separator, a thermally expandable capsule is sandwiched in an interlayer of a laminate formed of at least two separator sheets.

10 Claims, 3 Drawing Sheets

(56) References Cited

U.S. PATENT DOCUMENTS

| | | | | |
|---|---|---|---|---|
| 2014/0120402 A1* | 5/2014 | Yu | ............... | H01M 50/446 429/144 |
| 2019/0334149 A1 | 10/2019 | Li et al. | | |
| 2022/0209362 A1 | 6/2022 | Imai | | |

FOREIGN PATENT DOCUMENTS

| | | |
|---|---|---|
| JP | 2008226807 | 9/2008 |
| JP | 2009026674 | 2/2009 |
| JP | 2010086728 | 4/2010 |
| JP | 2013004305 | 1/2013 |
| WO | 2018086095 | 5/2018 |
| WO | 2021085487 | 5/2021 |

OTHER PUBLICATIONS

Gor et al. "Swelling and softening of lithium-ion battery separators in electrolyte solvents." Journal of Power Sources 294 (2015): 167-172. (Year: 2015).*

Gong, Wenzheng, et al. "Thermosensitive polyacrylonitrile/polyethylene oxide/polyacrylonitrile membrane separators for prompt and safer thermal lithium-ion battery shutdown." Journal of the Electrochemical Society 167.2 (2020): 020509. (Year: 2020).*

Vinh et al. "Electrospinning fabrication and performance evaluation of polyacrylonitrile nanofiber for air filter applications." Applied Sciences 6.9 (2016): 235. (Year: 2016).*

"Office Action of Japan Counterpart Application" with English translation thereof, issued on Dec. 6, 2022, p. 1-p. 10.

"Notice of Reasons for Refusal of Japan Counterpart Application", issued on Aug. 6, 2024, with English translation thereof, p. 1-p. 6.

"International Search Report (Form PCT/ISA/210) of PCT/JP2020/040485," mailed on Jan. 19, 2021, with English translation thereof, pp. 1-5.

"Written Opinion of the International Searching Authority (Form PCT/ISA/237)" of PCT/JP2020/040485, mailed on Jan. 19, 2021, with English translation thereof, pp. 1-8.

\* cited by examiner

NON-AQUEOUS ELECTROLYTIC SOLUTION SECONDARY BATTERY, SEPARATOR FORMED OF NON-AQUEOUS ELECTROLYTIC SOLUTION SECONDARY BATTERY, AND METHOD OF MANUFACTURING NON-AQUEOUS ELECTROLYTIC SOLUTION SECONDARY BATTERY

CROSS-REFERENCE TO RELATED APPLICATIONS

This application is a Continuation of PCT International Application No. PCT/JP2020/040485 filed on Oct. 28, 2020, which claims priority under 35 U.S.C. § 119 (a) to Japanese Patent Application No. 2019-197747 filed in Japan on Oct. 30, 2019. Each of the above applications is hereby expressly incorporated by reference, in its entirety, into the present application.

BACKGROUND OF THE INVENTION

1. Field of the Invention

The present invention relates to a non-aqueous electrolytic solution secondary battery, a separator formed of the non-aqueous electrolytic solution secondary battery, and a method of manufacturing the non-aqueous electrolytic solution secondary battery.

2. Description of the Related Art

A non-aqueous electrolytic solution secondary battery represented by a lithium ion secondary battery has a high energy density, has excellent storage performance, low temperature operability, and the like, and thus is widely used for a portable electronic apparatus such as a mobile phone or a laptop computer. In addition, as the size of the battery increases, the battery is also used for transportation equipment including automobiles, and the use for a storage device for night-time power or power generated by natural energy has increased.

In the non-aqueous electrolytic solution secondary battery, in a case where internal short-circuit occurs due to impurity metal in an electrode, the temperature of the battery locally increases. This local temperature increase triggers so-called thermal runaway.

As a technique for dealing with this thermal runaway, JP2009-26674A describes a lithium ion battery in which a thermal expansion (thermally expandable) capsule is added to a separator that is disposed between a positive electrode and a negative electrode and is infiltrated with an electrolytic solution. In the technique described in JP2009-26674A, the thermally expandable capsule expands during an increase in battery temperature, a space having no electrolytic solution is formed in the separator disposed between the electrodes, the migration of lithium ions is physically shut out, and thermal runaway can be suppressed.

In addition, JP2008-226807A describes a non-aqueous electrolyte secondary battery including a gas-forming agent that is provided on a surface of at least one of a positive electrode active material layer, an electrolyte layer, or a negative electrode active material layer or therein, in which when a temperature of the secondary battery is 60° C. or higher and lower than 300° C., gas is formed from the gas-forming agent. JP2008-226807A also discloses a battery configuration in which 1H-tetrazole (gas-forming agent) sandwiched between two separators is used instead of a typical separator. In the technique described in JP2008-226807A, when the temperature of the non-aqueous electrolyte secondary battery increases, gas is formed and diffused from the gas-forming agent. This diffused gas enters pores of the positive electrode active material layer, the separator, and the negative electrode active material layer to narrow or block a migration path of ions between the positive electrode active material layer and the negative electrode active material layer. As a result, the internal resistance increases, and a temperature increase and the occurrence of overcurrent and the like can be suppressed.

SUMMARY OF THE INVENTION

The thermally expandable capsule and the gas-forming agent described in JP2009-26674A and JP2008-226807A are foreign matter and have a disadvantageous effect on improvement of battery performance in a normal situation. Therefore, the amount of the thermally expandable capsule and the gas-forming agent used is required to be suppressed as far as possible.

However, with the method described in JP2009-26674A, a thermal expansion direction of the thermally expandable capsule cannot be controlled, and there is a limit to simultaneous achievement of reduction in the amount of the thermally expandable capsule used and improvement of a shutdown function (improvement of the speed and efficiency of the shutdown function).

In addition, in the technique described in JP2008-226807A, gas formed from the gas-forming agent is diffused in the battery without any limitation. Therefore, a large amount of gas is required for the shutdown, and there is a limit to increasing the speed of the shutdown.

Further, in either of the methods described in JP2009-26674A and JP2008-226807A, in a case where the battery enters a high temperature state such that thermal fusion of the separator progresses, it is difficult to stably maintain a formed shutdown state.

An object of the present invention is to provide: a non-aqueous electrolytic solution secondary battery in which, even in a case where the amount of a thermally expandable capsule used is suppressed, migration of ions between positive and negative electrodes during an increase in battery temperature can be shut down rapidly and more reliably and this shutdown state can be maintained even at a high temperature; a composite separator suitable for the non-aqueous electrolytic solution secondary battery; and a method of manufacturing the non-aqueous electrolytic solution secondary battery.

The present inventors repeatedly conducted a thorough investigation in consideration of the above-described objects. As a result, it was found that, by adopting a laminate in which a thermally expandable capsule is sandwiched between two separators that adhere to each other due to an action of an electrolytic solution as a separator disposed between a positive electrode active material layer and a negative electrode active material layer in a non-aqueous electrolytic solution secondary battery, the thermally expandable capsule expands rapidly two-dimensional (in a planar shape) along the space between the two separators during an increase in battery temperature such that shutdown can be performed and this shutdown state can be sufficiently maintained even in a case where the thermal fusion of the separators themselves progresses. Further, it was clarified that, since the expansion direction of the thermally expandable capsule is two-dimensionally controlled, the above-described effects can be obtained even in a case where the amount of the thermally expandable capsule as foreign matter having a disadvantageous effect on the battery performance is small.

The present invention has been completed based on the above findings as a result of repeated investigation.

The above-described problems are solved by the following means.

[1] A non-aqueous electrolytic solution secondary battery comprising:
- a positive electrode;
- a negative electrode; and
- a composite separator that is disposed between the positive electrode and the negative electrode,
- in which in the composite separator, a thermally expandable capsule is sandwiched in an interlayer of a laminate formed of at least two separator sheets.

[2] The non-aqueous electrolytic solution secondary battery according to [1],
in which a thermal expansion start temperature of the thermally expandable capsule is lower than a thermal fusion temperature of the separator sheets between which the thermally expandable capsule is sandwiched by 5° C. or more.

[3] The non-aqueous electrolytic solution secondary battery according to [1] or [2],
in which a particle diameter of the thermally expandable capsule is 1.5 times or more a pore diameter of the separator sheets between which the thermally expandable capsule is sandwiched.

[4] The non-aqueous electrolytic solution secondary battery according to any one of [1] to [3],
in which regarding a thermal expansion start temperature of the thermally expandable capsule, a measured value in an electrolytic solution is lower than a measured value in air by 10° C. or more.

[5] The non-aqueous electrolytic solution secondary battery according to any one of [1] to [4],
in which in a plan view of the composite separator, a ratio of a total area of portions where the thermally expandable capsule is disposed to a total area of the composite separator is 50% or less.

[6] The non-aqueous electrolytic solution secondary battery according to any one of [1] to [5],
in which the composite separator is in a state where the composite separator is pressurized in a laminating direction of the separator sheets.

[7] The non-aqueous electrolytic solution secondary battery according to any one of [1] to [6],
in which the separator sheets forming the composite separator are microporous films, and
the separator sheets forming the composite separator adhere to each other due to an action of an electrolytic solution.

[8] The non-aqueous electrolytic solution secondary battery according to any one of [1] to [7],
in which the separator sheets are bonded to each other around and/or near the composite separator.

[9] A composite separator for a non-aqueous electrolytic solution secondary battery,
in which a thermally expandable capsule is sandwiched in an interlayer of a laminate formed of at least two separator sheets.

[10] A method of manufacturing a non-aqueous electrolytic solution secondary battery comprising:
disposing the composite separator for a non-aqueous electrolytic solution secondary battery according to [9] between a positive electrode and a negative electrode.

In the description of the present invention, numerical ranges represented by "to" include numerical values before and after "to" as lower limit values and upper limit values.

In the present invention, "non-aqueous electrolytic solution" refers to an electrolytic solution substantially not including water. That is, "non-aqueous electrolytic solution" may include a small amount of water in a range where the effects of the present invention do not deteriorate. In the present invention, the concentration of water in "non-aqueous electrolytic solution" is 200 ppm (mass ppm), preferably 100 ppm or less, and more preferably 20 ppm or less. It is realistically difficult to achieve a non-aqueous electrolytic solution including no water, and the concentration of water is typically 1 ppm or more.

In the present invention, "non-aqueous electrolytic solution secondary battery" broadly includes a secondary battery including a non-aqueous electrolytic solution.

In the non-aqueous electrolytic solution secondary battery according to the present invention, even in a case where the amount of a thermally expandable capsule used is suppressed, migration of ions between positive and negative electrodes during an increase in battery temperature can be shut down rapidly and more reliably and this shutdown state can be maintained even at a high temperature. In addition, the composite separator for a non-aqueous electrolytic solution secondary battery according to the present invention is suitable as a separator of the non-aqueous electrolytic solution secondary battery according to the present invention. In addition, with a method of manufacturing a non-aqueous electrolytic solution secondary battery according to the present invention, it is possible to obtain a non-aqueous electrolytic solution secondary battery in which, even in a case where the amount of a thermally expandable capsule used is suppressed, migration of ions between positive and negative electrodes during an increase in battery temperature can be shut down rapidly and more reliably and this shutdown state can be maintained even at a high temperature.

DESCRIPTION OF THE PREFERRED EMBODIMENTS

Preferable embodiments of a non-aqueous electrolytic solution secondary battery according to the present invention will be described. However, the present invention is not limited to these embodiments except for features defined by the present invention.

[Non-Aqueous Electrolytic Solution Secondary Battery]

A non-aqueous electrolytic solution secondary battery according to an embodiment of the present invention includes a positive electrode, a negative electrode, and a composite separator that is disposed between the positive electrode and the negative electrode. This composite separator is a laminate formed of at least two separator sheets, in which a thermally expandable capsule is sandwiched in an interlayer of the laminate.

In a case where the composite separator is a laminate of three or more separator sheets, this laminate includes two or more interlayers. In this case, the thermally expandable capsule may be present in any of the interlayers. That is, the thermally expandable capsule may be present in one interlayer among two or more interlayers, or may be present in the two or more interlayers.

Constituent materials of a plurality of separator sheets forming one composite separator may be the same as or different from each other.

From the viewpoint of reducing the thickness of the obtained non-aqueous electrolytic solution secondary battery, it is preferable that the number of separator sheets forming the composite separator is two.

The non-aqueous electrolytic solution secondary battery according to the embodiment of the present invention can adopt a configuration of a typical non-aqueous electrolytic solution secondary battery except for the configuration of the separator.

Figure 1:
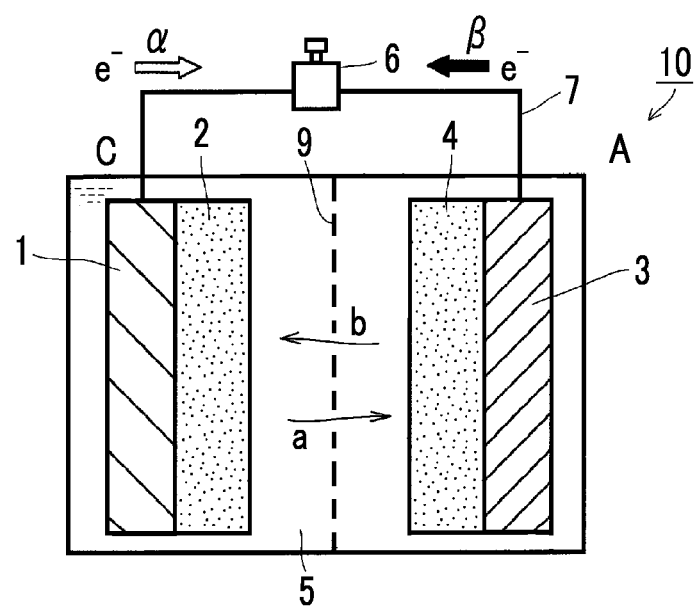
FIG. 1 is a diagram (vertical cross-sectional view) showing an operative mechanism of a lithium ion secondary battery as one aspect of a non-aqueous electrolytic solution secondary battery.

FIG. 1 is a diagram (conceptual diagram) showing an operative mechanism of a lithium ion secondary battery as one aspect of the non-aqueous electrolytic solution secondary battery. A lithium ion secondary battery 10 includes: a non-aqueous electrolytic solution 5; a positive electrode C (including a positive electrode current collector 1 and a positive electrode active material layer 2) capable of intercalating and deintercalating lithium ions; and a negative electrode A (including a negative electrode current collector 3 and a negative electrode active material layer 4) capable of intercalating and deintercalating or dissolving and depositing lithium ions. A separator 9 is disposed between the positive electrode C and the negative electrode A. By adopting this battery configuration, during charging (α), electrons (e⁻) are supplied from the positive electrode side to the negative electrode side through a circuit wiring 7, lithium ions are deintercalated from the positive electrode active material layer 2, and the lithium ions migrate to the negative electrode side through the non-aqueous electrolytic solution 5 and are intercalated in the negative electrode active material layer (a). In addition, during discharging (β), the lithium ions intercalated in the negative electrode active material layer are deintercalated, and the deintercalated lithium ions are intercalated in the positive electrode active material layer through the non-aqueous electrolytic solution 5 (b). Concurrently, electrons are supplied to an operating mechanism 6 through a circuit wiring 7. This mechanism is the operative mechanism of the lithium ion secondary battery.

Hereinabove, the operative mechanism of the non-aqueous electrolytic solution secondary battery has been conceptually described using the lithium ion secondary battery as an example. Next, a specific shape of the non-aqueous electrolytic solution secondary battery will be described. As a specific battery shape of the non-aqueous electrolytic solution secondary battery, a bottomed cylindrical shape, a bottomed square shape, a thin shape, a sheet shape, or a paper shape is known. The non-aqueous electrolytic solution secondary battery according to the embodiment of the present invention may have any shape as long as it functions as a battery through the above-described operative mechanism. In addition, the battery shape may be a horseshoe shape or a comb shape in consideration of the form of a system or an apparatus to be incorporated.

Figure 2:
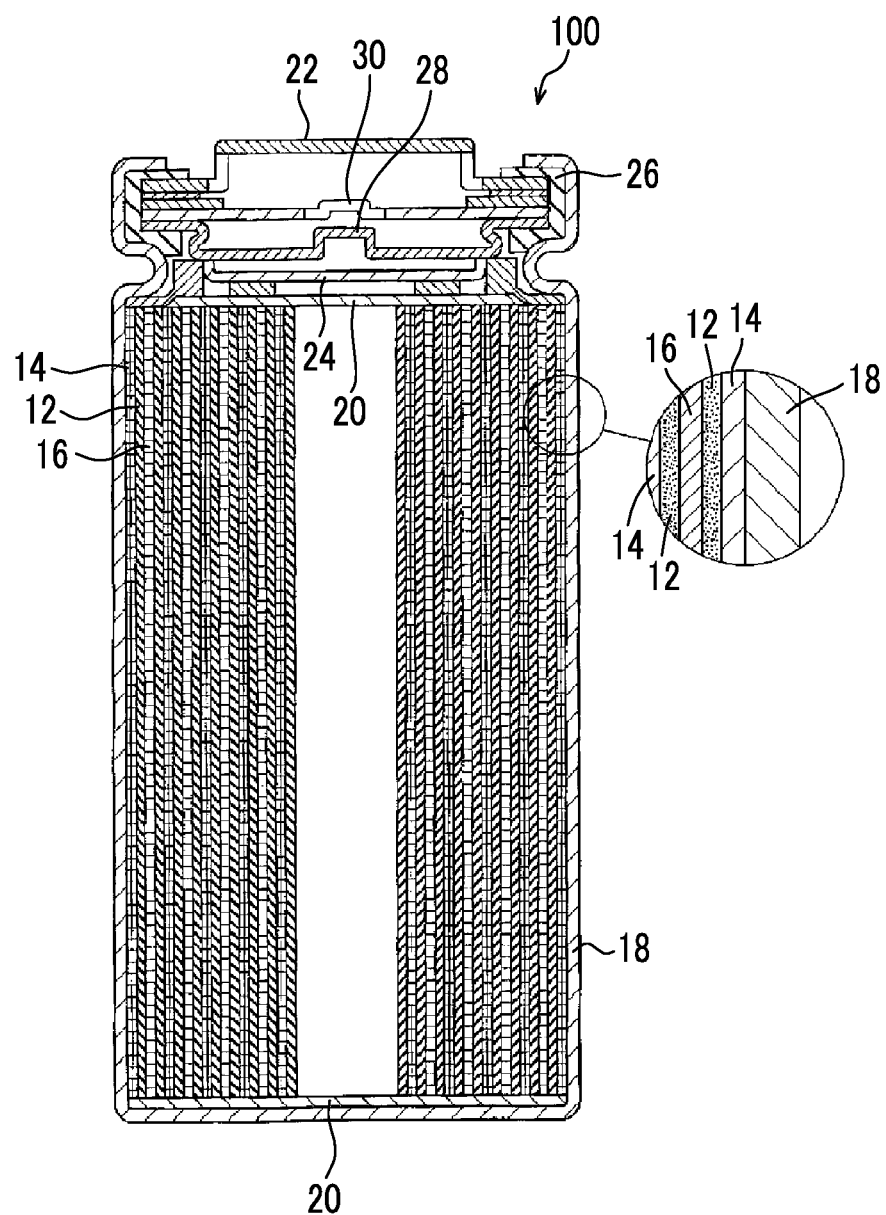
FIG. 2 is a vertical cross-sectional view showing one example of a specific structure of the non-aqueous electrolytic solution secondary battery.

FIG. 2 is an example of a bottomed cylindrical non-aqueous electrolytic solution secondary battery 100. This battery is the bottomed cylindrical non-aqueous electrolytic solution secondary battery 100 in which a positive electrode sheet 14 and a negative electrode sheet 16 laminated through a separator 12 are wound and accommodated in an outer can 18 (this outer can 18 functions as a negative electrode current collector). In the drawing, reference numeral 20 represents an insulating plate, reference numeral 22 represents a sealing plate, reference numeral 24 represents a positive electrode current collector, reference numeral 26 represents a gasket, reference numeral 28 represents a pressure-sensitive valve, and reference numeral 30 represents a current interrupting element. In an enlarged circle, a hatched portion is different from that of the overall diagram in consideration of visibility, but the respective members represented by reference numerals corresponds to those in the overall diagram.

The respective materials, the electrolytic solution, the members, and the like used in the non-aqueous electrolytic solution secondary battery according to the embodiment of the present invention are not particularly limited except for the configuration of the separator. As the materials, the members, and the like, those that can be used in a typical non-aqueous electrolytic solution secondary battery can be appropriately applied. In addition, as a method of manufacturing the non-aqueous electrolytic solution secondary battery according to the embodiment of the present invention, a typical method can be appropriately applied except for the configuration of the separator. For example, the details can be found in JP2016-201308A, JP2008-226807A, and the like.

Hereinafter, the composite separator that is the characteristic configuration of the non-aqueous electrolytic solution secondary battery according to the embodiment of the present invention will be described.

<Composite Separator>

As described above, the composite separator used in the non-aqueous electrolytic solution secondary battery according to the embodiment of the present invention is a laminate formed of at least two separator sheets, and a thermally expandable capsule is sandwiched in an interlayer of the laminate. As in a typical separator used in a non-aqueous electrolytic solution secondary battery, the composite separator used in the present invention functions as a positive electrode-negative electrode separation film that has pores and insulates the positive and negative electrodes from each other while allowing permeation of an electrolytic solution and ions in a typical battery usage state. In addition, in a case where the battery temperature increases due to the occurrence of any battery abnormality, thermal fusion occurs in a typical separator, and the pores are blocked by this thermal fusion and the ion conduction between the positive and negative electrodes is blocked such that the battery function stops. On the other hand, in the composite separator according to the embodiment of the present invention, the thermally expandable capsule thermally expands rapidly before the thermal fusion of the separator, and migration of ions between the positive and negative electrodes can be shut down rapidly and more reliably. In addition, this shutdown state can be maintained even at a high temperature.

Regarding the composite separator used in the present invention, the configuration where the thermally expandable capsule is sandwiched in an interlayer of the laminate formed of two separator sheets will be described below. The composite separator used in the present invention is not limited to these embodiments except for the features defined by the present invention.

Figure 3:
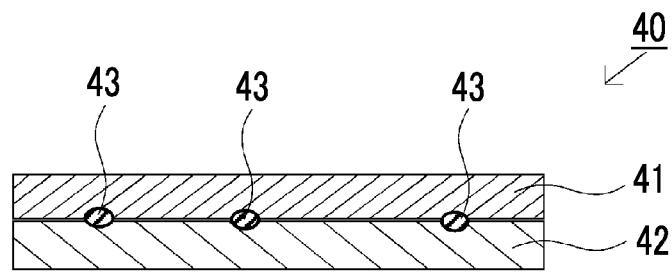
FIG. 3 is a diagram (vertical cross-sectional view) schematically showing a state of a composite separator disposed in a non-aqueous electrolytic solution secondary battery according to the present invention.

FIG. 3 is a vertical cross-sectional view schematically showing a state of the composite separator disposed in the non-aqueous electrolytic solution secondary battery according to the embodiment of the present invention. As shown in FIG. 3, a composite separator 40 has a configuration in which two separator sheets 41 and 42 are laminated, in which a thermally expandable capsule 43 is sandwiched in an interlayer of the laminate. The two separator sheets 41 and 42 are typically microporous films and adhere to each other due to the action of the electrolytic solution. That is, the separator sheets infiltrated with the electrolytic solution are bonded to each other in the laminated state because the electrolytic solution acts like an adhesive. For example, this is the same as a phenomenon in which the adhesiveness increases in a case where tissue paper absorbs water. Accordingly, in the non-aqueous electrolytic solution secondary battery, the composite separator infiltrated with the electrolytic solution is in a state where the two separator sheets 41 and 42 adhere to each other due to the action of the electrolytic solution in a portion where the thermally expandable capsule 43 is not disposed. The constituent materials of the two separator sheets 41 and 42 may be the same as or different from each other.

Figure 4:
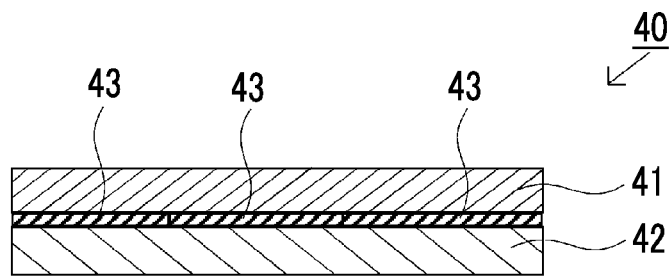
FIG. 4 is a diagram (vertical cross-sectional view) schematically showing a state where a thermally expandable capsule of the composite separator is thermally expanded in a case where the non-aqueous electrolytic solution secondary battery according to the present invention is exposed to a high temperature.

In the non-aqueous electrolytic solution secondary battery according to the embodiment of the present invention, in a case where the battery temperature increases to a predetermined temperature or higher, the composite separator 40 that is disposed in the state shown in FIG. 3 expands two-dimensionally along an interface between the two separator sheets 41 and 42. FIG. 4 schematically shows this thermally expanded state. As shown in FIG. 4, in a case where the battery temperature increases due to some reason, the composite separator in the non-aqueous electrolytic solution secondary battery according to the embodiment of the present invention enters a state where there is no electrolytic solution between the laminated separator sheets such that the battery function stops.

In the non-aqueous electrolytic solution secondary battery according to the embodiment of the present invention, a thermal expansion start temperature (foaming start temperature in air (1 atm)) of the thermally expandable capsule is preferably lower than a thermal fusion temperature of the separator sheets between which the thermally expandable capsule is sandwiched and is more preferably a thermal fusion temperature of the separator sheets by 5° C. or more. Due to this relationship, migration of ions between positive and negative electrodes during an increase in battery temperature can be shut down rapidly and more reliably. The thermal expansion start temperature of the thermally expandable capsule is typically 70° C. to 140° C. and preferably 70° C. to 120° C. In addition, the thermal fusion temperature of the separator sheets is typically 120° C. to 160° C. and preferably 120° C. to 130° C.

Here, the thermal expansion start temperature of the thermally expandable capsule is a temperature at which the volume of the thermally expandable capsule expands two or more times in 1 atm due to thermal expansion. In addition, the thermal fusion temperature of the separator sheets has the same definition as a melting point of the constituent materials of the separator sheets. In a case where the constituent materials of the separator sheets are two or more kinds, regarding the relationship with the thermal expansion start temperature of the thermally expandable capsule, the melting point of a material having the lowest melting point is set as the thermal fusion temperature of the separator sheets.

In the non-aqueous electrolytic solution secondary battery according to the embodiment of the present invention, it is preferable that a particle diameter of the thermally expandable capsule forming the composite separator is more than a pore diameter of the separator sheets between which the thermally expandable capsule is sandwiched, and it is more preferable that a particle diameter of the thermally expandable capsule forming the composite separator is 1.5 times or more a pore diameter of the separator sheets between which the thermally expandable capsule is sandwiched. Due to this relationship, the thermally expandable capsule is not likely to enter the separator sheets, and in a case where the thermally expandable capsule thermally expands, the expansion direction can be controlled to a direction along the interface between the laminated separator sheets more reliably. That is, the thermally expandable capsule that expands in an interlayer of the laminate where the separator sheets adhere to each other expands two-dimensionally (plane direction) to cut the interlayer open, and the composite separator can rapidly enter a state where there is no electrolytic solution in a heat generation portion and the vicinity thereof. Typically, a predetermined pressure (typically, "atmospheric pressure"+"0.05 to 0.1 MPa" is applied to the non-aqueous electrolytic solution secondary battery in the laminating direction of the composite separator. Therefore, the thermally expandable capsule is not likely to expand in the laminating direction of the separator sheets.

"The particle diameter of the thermally expandable capsule" refers to the average particle diameter of the thermally expandable capsule used. This average particle diameter is published from a manufacturer or a seller of the thermally expandable capsule. In a case where the average particle diameter published from the manufacturer or the seller is unclear, "the particle diameter of the thermally expandable capsule" is a volume median size (d50).

In addition, "the pore diameter of the separator sheets" refers to a value obtained by observing any 20 pores (entrances of the holes) on a surface of the separator sheet using an electron microscope, measuring the maximum value of the width of each of the 20 pores on the separator sheet surface in a direction perpendicular to a maximum diameter direction, and obtaining an arithmetic mean value of the 20 measured values. "The maximum diameter" of the pore refers to a maximum value of the distance between one point of an inner circumference of the hole on the separator sheet surface and another point of the inner circumference. The pore diameter of the separator sheets is measured in a state where the separator sheets are dried.

The particle diameter of the thermally expandable capsule used in the present invention is preferably 1 to 20 μm, more preferably 1 to 15 μm, and still more preferably 1 to 12 μm. In addition, the particle diameter may be 1 to 10 μm, may be 1 to 5 μm, and is preferably 1 to 3 μm. In addition, the pore diameter of the separator sheets is preferably 1 μm or less. For example, the pore diameter can be 0.01 to 1 μm, may be 0.01 to 0.8 μm, and is preferably 0.01 to 0.5 μm, more preferably 0.02 to 0.2 μm, and still more preferably 0.03 to 0.1 μm.

Next, a preferable embodiment of a constituent material of the composite separator used in the present invention will be described.

<Separator Sheet>

As the separator sheet forming the composite separator, a separator that is typically used in a non-aqueous electrolytic solution secondary battery can be used without any particular limitation within a range where the effects of the present invention do not deteriorate. Examples of the constituent material of the separator sheets include a porous polymer material, an inorganic material, an organic-inorganic hybrid material, and glass fibers. The volume ratio of voids in the separator sheets, that is, the void volume is preferably 20% to 90% and more preferably 35% to 80%.

Examples of the polymer material include cellulose nonwoven fabric, polyethylene, and polypropylene. A separator sheet formed of a combination of the examples can also be used. A laminate of two or more microporous films having different pore diameters, void volumes, and pore blocking temperatures is also preferable.

Examples of the inorganic material include: an oxide such as alumina or silicon dioxide; a nitride such as aluminum nitride or silicon nitride; and a sulfate such as barium sulfate or calcium sulfate.

<Thermally Expandable Capsule>

Typically, the thermally expandable capsule is formed of a thermoplastic resin including a foaming agent. The foaming agent is not particularly limited as long as it expands at a desired temperature. Examples of the foaming agent include: a chemical foaming agent such as an azo compound, a nitroso compound, a hydrazine derivative, a semicarbazide compound, a tetrazole compound, an isocyanate compound, a bicarbonate, a carbonate, a nitrite, a hydride, sodium bicarbonate and an acid, hydrogen peroxide and yeast, or zinc powder and an acid; and a physical foaming agent such as butane, pentane, hexane, dichloroethane, dichloromethane, chlorofluorocarbon, air, carbon dioxide gas, or nitrogen gas.

Regarding the thermally expandable capsule used in the present invention, it is preferable the volume expands, for example, by vaporizing low boiling point liquid such that the internal pressure is sufficient for expanding the capsule. Regarding a method of controlling the temperature for the volume expansion, the temperature can be controlled by selecting a liquid having a boiling point similar to the desired temperature as the low boiling point liquid sealed in the capsule. In addition, in order to cause the volume expansion to progress rapidly, it is preferable that a shell portion of the capsule is formed of a thermoplastic resin or the like having a softening point of a predetermined temperature or lower. In order to form the capsule, a well-known method such as coacervation can be adopted.

Examples of a commercially available product of the thermally expandable capsule include: EXPANCEL 051DU, 007WU, 053WU, 053DU, 054WU, 091DU, 091-080DU, 091-140-DU, 092-120DU, 093-120DU, 820WU, 642WU, 551WU, 551DU, 551-20WU, 551-20DU, 551-80WU, 551-80DU, 461WU, 461DU, and 461-20 manufactured by Japan Fillite Co., Ltd.; and MICROCAPSULE F-20, F-30, F-40, F-50, F-80S, F-82, F-85, F-100, and FN-100SSD manufactured by Matsumoto Yushi-Seiyaku Co., Ltd. These products are formed of a foaming agent consisting of a shell of a copolymer and a hydrocarbon having a low boiling point in the shell. When the temperature reaches a predetermined value between about 70° C. and 200° C., the volume expands, for example, 40 to 60 times by the softening of the shell portion and the vaporization of the content.

It is preferable that, regarding the thermal expansion start temperature of the thermally expandable capsule used in the present invention, a measured value in the electrolytic solution of the non-aqueous electrolytic solution secondary battery (in the electrolytic solution disposed at 1 atm) is lower than a measured value in air (1 atm) by 10° C. or more. As a result, in the non-aqueous electrolytic solution secondary battery, the thermal expansion responsiveness to an increase in battery temperature is improved, and in a case where battery abnormality occurs, shutdown can be performed more rapidly.

In a case where the thermal expansion start temperature decreases in the electrolytic solution of the non-aqueous electrolytic solution secondary battery, one reason for the decrease is presumed to be that, in a case where the thermal expansion microcapsule is dipped in the non-aqueous electrolytic solution, a polar solvent in the electrolytic solution plasticizes the capsule wall. As the boiling point of the polar solvent in the electrolytic solution decreases, a decrease in thermal expansion start temperature becomes more significant.

It is preferable that, in a plan view of the composite separator used in the present invention, a ratio of a total area of portions where the thermally expandable capsule is disposed (area in a case where the thermally expandable capsule is horizontally projected to the separator sheet) to a total area of the composite separator is 50% or less. This way, even in a case where the thermally expandable capsule is sparsely sprinkled in a practically single layer between the separator sheets, the desired effects of the present invention can be obtained. In addition, this ratio is preferably as small as possible in a range where the effects of the present invention are exhibited, more preferably 40% or less, still more preferably 30% or less, and still more preferably 20% or less. Even in a case where the amount of the thermally expandable capsule used is reduced, in the non-aqueous electrolytic solution secondary battery according to the embodiment of the present invention where the thermal expansion of the thermally expandable capsule can be two-dimensionally controlled, the shutdown effect can be rapidly implemented.

It is preferable that the separator sheets are bonded to each other around and/or near the composite separator used in the present invention. With this configuration, even in a case where the shell is broken, for example, during the thermal expansion of the thermally expandable capsule such that gas leaks from the capsule, dissipation of gas from the interface between the laminated separator sheets can be delayed, which can contribute to the stable maintenance of the shutdown state. The bonding between the separator sheets can be performed by heat sealing or the like, and it is preferable that heat sealing or the like is linearly performed around the composite separator.

The state where the composite separator is disposed between the positive electrode and the negative electrode of the non-aqueous electrolytic solution secondary battery is described above. On the other hand, the above-described composite separator can be separately provided before being incorporated into the non-aqueous electrolytic solution secondary battery as a composite separator for a non-aqueous electrolytic solution secondary battery.

That is, according to the present invention, it is possible to provide a composite separator for a non-aqueous electrolytic solution secondary battery in which a thermally expandable capsule is sandwiched in an interlayer of a laminate formed of at least two separator sheets. This composite separator for a non-aqueous electrolytic solution secondary battery may be in dry state without being wet by an electrolytic solution or the like or may be in a wet state by being wet by an electrolytic solution or the like. In addition, the size of the composite separator for a non-aqueous electrolytic solution secondary battery according to the embodiment of the present invention is not particularly limited. In a case where a composite separator having a large size is prepared and is incorporated into a non-aqueous electrolytic solution secondary battery, the composite separator can also be cut in a desired size and used.

The composite separator according to the embodiment of the present invention can be manufactured by disposing the thermally expandable capsule to be substantially uniformly dispersed (sprinkled) in a desired interlayer in a case where at least two separator sheets are laminated.

In addition, it is also preferable that a laminate of the separator sheets in which the thermally expandable capsule is disposed in a desired interlayer and the separator sheets are bonded to each other around and/or near the laminate. For example, by performing heat sealing with a width of 1 to 10 mm around the composite separator, the separator sheets adjacent to each other can are bonded to each other around the composite separator.

A non-aqueous electrolytic solution secondary battery can be manufactured using the composite separator according to the embodiment of the present invention. That is, according to the present invention, it is possible to provide a method of manufacturing a non-aqueous electrolytic solution secondary battery comprising: disposing the composite separator for a non-aqueous electrolytic solution secondary battery according to the embodiment of the present invention between a positive electrode and a negative electrode. The composite separator for a non-aqueous electrolytic solution secondary battery can be disposed between the positive electrode and the negative electrode using a method of disposing a separator in a typical non-aqueous electrolytic solution secondary battery.

The non-aqueous electrolytic solution secondary battery according to the embodiment of the present invention can be mounted on an electronic apparatus such as a laptop computer, a pen-input PC, a mobile personal computer, an electronic book player, a mobile phone, a cord-less phone system, a pager, a handy terminal, a portable fax, a portable copying machine, a portable printer, a headphone stereo set, a video camera, a liquid crystal television, a handy cleaner, a portable CD player, a mini disc player, an electric shaver, a transceiver, an electronic organizer, an electronic calculator, a memory card reader, a portable tape recorder, a radio player, a backup power supply, or a memory card reader. In addition, for consumer use, the non-aqueous electrolytic solution secondary battery can be mounted on an automobile, an electromotive vehicle, a motor, a lighting apparatus, a toy, a game device, a load conditioner, a timepiece, a strobe, a camera, or a medical device (for example, a pacemaker, a hearing aid, or a shoulder massager). Further, the non-aqueous electrolytic solution secondary battery can be used as various cells for use in military or aerospace applications. In addition, the non-aqueous electrolytic solution secondary battery can also be combined with solar batteries.

Hereinafter, the present invention will be described in more detail on the basis of examples. Meanwhile, the present invention is not interpreted to be limited thereto.

EXAMPLES

[Preparation of Non-Aqueous Electrolytic Solution]

$LiPF_6$ as a lithium salt was dissolved in a non-aqueous solvent including 40 mass % of ethylene carbonate and 60 mass % of ethyl methyl carbonate such that the concentration was 1 M. As a result, a non-aqueous electrolytic solution was prepared.

[Preparation of Positive Electrode Active Material Layer-Forming Material]

A composition including 85 mass % of lithium nickel manganese oxide ($LiNi_{0.5}Mn_{1.5}O_4$) as a positive electrode active material and 7 mass % of carbon black as a conductive auxiliary agent, and 8 mass % of polyvinylidene fluoride (PVDF) as a binder was prepared as a positive electrode active material layer-forming material.

[Preparation of Negative Electrode Active Material Layer-Forming Material]

A composition including 92 mass % of natural graphite (Gr) as a negative electrode active material and 8 mass % of PVDF as a binder was prepared as a negative electrode active material layer-forming material.

[Composite Separator]

Two polypropylene separator sheets having a size of length 5 cm×width 6 cm×thickness 20 μm, a pore diameter of 1 μm or less, and a thermal fusion temperature of 160° C. were prepared. As a thermally expandable capsule, Matsumoto Microsphere FN-100SSD (manufactured by Matsumoto Yushi-Seiyaku Co., Ltd., thermal expansion start temperature in air (1 atm): 120° C. to 130° C., average particle diameter: 6 to 11 μm (manufacturer published value)) was disposed to be substantially uniformly sprinkled in a single layer between the two separator sheets. As a result, a composite separator was prepared, the composite separator consisting of: the thermally expandable capsule; and the two separator sheets between which the thermally expandable capsule was sandwiched. In a plan view of the composite separator, a ratio of a total area of portions where the thermally expandable capsule is disposed to a total area of the composite separator was 40% to 48%.

The obtained composite separator was used for a non-aqueous electrolytic solution secondary battery according to Example 2. In addition, heat sealing was performed with a width of 5 mm on four sides around the obtained composite separator using a heat sealer, and this composite separator was used for a non-aqueous electrolytic solution secondary battery according to Example 1. In addition, two separator sheets were laminated without interposing the thermally expandable capsule therebetween, heat sealing was performed with a width of 5 mm on four sides around the laminate, and this composite separator was used for a non-aqueous electrolytic solution secondary battery according to Comparative Example. The preparation of the non-aqueous electrolytic solution secondary battery will be described below.

[Preparation of Non-Aqueous Electrolytic Solution Secondary Battery]

Figure 5:
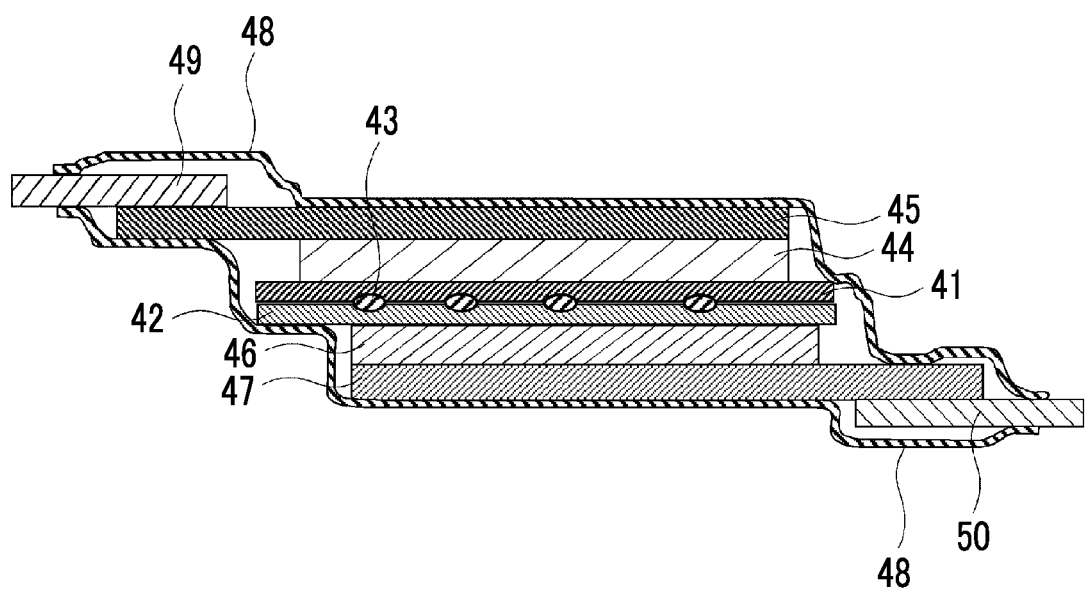
FIG. 5 is a vertical cross-sectional view schematically showing a structure of a laminated cell battery as a non-aqueous electrolytic solution secondary battery prepared in Examples.

A laminated cell battery shown in FIG. 5 was prepared as follows (FIG. 5 schematically shows a configuration in which the composite separator includes the thermally expandable capsule).

The positive electrode active material layer-forming material was applied to an aluminum current collector foil (length 3.8 cm×width 5.3 cm×thickness 80 μm), was dried, and was pressed to prepare a positive electrode. In addition, the negative electrode active material layer-forming material was applied to a copper current collector foil (length 4 cm×width 5.5 cm×thickness 80 μm), was dried, and was pressed to prepare a negative electrode. In a state where the composite separator was sandwiched between the positive electrode and the negative electrode, the laminate was put into a bag prepared using an Al laminate film, and the bag was filled with an electrolytic solution and was vacuum-sealed. As a result, a laminated cell battery was prepared. The obtained laminated cell battery was sandwiched between SUS plates (length 5 cm×width 7 cm×thickness 1 mm), and the laminate was restrained at atmospheric pressure+0.05 MPa and was used for the following test.

[Test Example] Evaluation of Shutdown Performance

Using the non-aqueous electrolytic solution secondary battery (laminated cell battery) prepared as described above, shutdown performance during an increase in battery temperature was evaluated as follows.

The battery was left to stand on a hot plate set to 50° C., the internal resistance was measured using an alternating current method of 1 kHz while increasing the temperature of the hot plate at a temperature increase rate of 5° C./min. In a case where the resistance value at 50° C. was set as "1", an increase rate of a resistance value during a temperature increase was investigated.

The results are shown in the table below.

TABLE 1

Increase Rate of Resistance Value during Temperature Increase (Relative Value with respect to 1 as Resistance Value at 50° C.)

| | 50° C. | 70° C. | 80° C. | 90° C. | 110° C. | 130° C. | 150° C. | 170° C. | 180° C. |
|---|---|---|---|---|---|---|---|---|---|
| Example 1 | 1 | 1 | 2.3 | 3.2 | 4.2 | 9.1 | 20 | 939 | 1357 |
| Example 2 | 1 | 1 | 1 | 1 | 2 | 10 | 250 | 1750 | 3500 |
| Comparative Example | 1 | 1 | 1 | 1 | 1 | 1.2 | 15 | 3400 | 400 |

As shown in the table, it can be seen that, by using the composite separator according to the embodiment of the present invention, the shutdown function can be exhibited even in a state where a temperature increase is lower. In addition, it was found that, by sealing the portions around the composite separator, the shutdown function starts to be exhibited even in a lower temperature range.

In addition, it was found that, even in a case where the thermal fusion state of the separator sheet progresses at a high temperature (180° C. or higher) such that the separator sheet itself cannot maintain a high shutdown state, by using the composite separator according to the embodiment of the present invention, the shutdown state can be further improved even in the high temperature state. The reason for this is presumed to be as follows. Even in a case where the thermal fusion state of the two separator sheets progresses, the sheets are retained by the thermally expanded capsule (resin) or gas present to be sandwiched therebetween, and the two thermally fused separator sheets and the thermally expanded capsule or gas work together to contribute to stable shutdown.

The present invention has been described using the embodiments. However, unless specified otherwise, any of the details of the above description is not intended to limit the present invention and can be construed in a broad sense within a range not departing from the concept and scope of the present invention disclosed in the accompanying claims.

Explanation of References

C: positive electrode
1: positive electrode conductive material (current collector)
2: positive electrode active material layer
A: negative electrode
3: negative electrode conductive material (current collector)
4: negative electrode active material layer
5: non-aqueous electrolytic solution
6: operating mechanism
7: circuit wiring
9: separator
10: lithium ion secondary battery
12: separator
14: positive electrode sheet
16: negative electrode sheet
18: outer can that also functions as negative electrode current collector
20: insulating plate
22: sealing plate
24: positive electrode current collector
26: gasket
28: pressure-sensitive valve
30: current interrupting element
100: bottomed cylindrical lithium ion secondary battery
40: composite separator
41, 42: separator sheet
43: thermally expandable capsule (before and after expansion)
44: positive electrode active material layer
45: aluminum current collector foil
46: negative electrode active material layer -continued Explanation of References 47: copper current collector foil
48: Al laminate film
49, 50: circuit wiring

What is claimed is:

1. A non-aqueous electrolytic solution secondary battery comprising: a positive electrode; a negative electrode; and a composite separator that is disposed between the positive electrode and the negative electrode,
   wherein the composite separator is a laminate formed of at least two separator sheets, and a plurality thermally expandable capsules, in which each of the plurality of expandable capsules is in direct physical contact with the at least two separator sheets.

2. The non-aqueous electrolytic solution secondary battery according to claim 1, to wherein a thermal expansion start temperature of the thermally expandable capsule is lower than a thermal fusion temperature of the at least two separator sheets by 5 C or more.

3. The non-aqueous electrolytic solution secondary battery according to claim 1, wherein a particle diameter of each of the plurality thermally expandable capsule is 1.5 times or more a pore diameter of the at least two separator sheets.

4. The non-aqueous electrolytic solution secondary battery according to claim 1, wherein regarding a thermal expansion start temperature of the plurality of thermally expandable capsules, a measured value in an electrolytic solution is lower than a measured value in air by 10° C. or more.

5. The non-aqueous electrolytic solution secondary battery according to claim 1, wherein in a plan view of the composite separator, a ratio of a total area of portions where the plurality of thermally expandable capsules is disposed to a total area of the composite separator is 50% or less.

6. The non-aqueous electrolytic solution secondary battery according to claim 1, wherein the composite separator is in a state where the composite separator is pressurized in a laminating direction of the at least two separator sheets.

7. The non-aqueous electrolytic solution secondary battery according claim 1, to wherein the at least two separator sheets forming the composite separator are each microporous films, and the at least two separator sheets forming the composite separator adhere to each other due to an action of an electrolytic solution.

8. The non-aqueous electrolytic solution secondary battery according to claim 1, wherein the at least two separator sheets are bonded to each other around the plurality of thermally expandable capsules.

9. A composite separator for a non-aqueous electrolytic solution secondary battery, wherein the composite separator is a laminate formed of at least two separator sheets, and a plurality thermally expandable capsules, in which each of the plurality of expandable capsules is in direct physical contact with the at least two separator sheets.

10. A method of manufacturing a non-aqueous electrolytic solution secondary battery comprising: disposing the composite separator for a non-aqueous electrolytic solution secondary battery according to claim 9 between a positive electrode and a negative electrode.

* * * * *